(12) United States Patent
Buchan

(10) Patent No.: US 11,247,921 B2
(45) Date of Patent: Feb. 15, 2022

(54) METHOD AND APPARATUS FOR DOSING A DISSOLVABLE CHEMICAL TO WATER

(71) Applicant: CONTROL CHEMICALS (PTY) LTD, Johannesburg (ZA)

(72) Inventor: Peter James Buchan, Johannesburg (ZA)

(73) Assignee: CONTROL CHEMICALS (PTY) LTD, Johannesburg (ZA)

( * ) Notice: Subject to any disclaimer, the term of this patent is extended or adjusted under 35 U.S.C. 154(b) by 0 days.

(21) Appl. No.: 16/692,739

(22) Filed: Nov. 22, 2019

(65) Prior Publication Data
US 2020/0087178 A1 Mar. 19, 2020

Related U.S. Application Data

(62) Division of application No. 15/312,276, filed as application No. PCT/IB2015/053679 on May 19, 2015, now abandoned.

(30) Foreign Application Priority Data

May 19, 2014 (ZA) .................................. 2014/03628

(51) Int. Cl.
*C02F 1/68* (2006.01)
*B01F 1/00* (2006.01)

(52) U.S. Cl.
CPC ............ *C02F 1/688* (2013.01); *B01F 1/0033* (2013.01); *B01F 2001/0061* (2013.01); *B01F 2215/0052* (2013.01); *C02F 2303/04* (2013.01)

(58) Field of Classification Search
CPC ............... Y10T 137/4891; C02F 1/688; B01F 2001/005; B01F 2001/0061; B01F 1/0027; B01F 1/0033; B01F 2001/0055
See application file for complete search history.

(56) References Cited

U.S. PATENT DOCUMENTS

| | | | |
|---|---|---|---|
| 2,820,701 A | | 1/1958 | Leslie |
| 3,474,817 A | * | 10/1969 | Bates ...................... C02F 1/688 137/268 |
| 3,595,786 A | * | 7/1971 | Horvath .................. C02F 1/688 210/198.1 |
| 5,234,588 A | | 8/1993 | Aymes |
| 2011/0303589 A1 | | 12/2011 | Kuennen et al. |

FOREIGN PATENT DOCUMENTS

DE 102006062910 B4 5/2014

OTHER PUBLICATIONS

International Search Report and Written Opinion for PCT/IB2015/053679 dated Jul. 29, 2016.

* cited by examiner

*Primary Examiner* — Ryan B Huang
(74) *Attorney, Agent, or Firm* — Thompson Coburn LLP; Steven M. Ritchey

(57) ABSTRACT

A method of treating water includes directing a stream of water towards a lateral side of a water treatment substance body contained within a holder. The water stream serves to abrade the water treatment substance body, thereby to dose the water with the water treatment substance. Dosed water is thus formed. The dosed water is allowed to pass through at least one opening in the holder.

5 Claims, 9 Drawing Sheets

METHOD AND APPARATUS FOR DOSING A DISSOLVABLE CHEMICAL TO WATER

CROSS-REFERENCE TO RELATED APPLICATIONS

This application is divisional application of U.S. Ser. No. 15/312,276, filed on Nov. 18, 2016, claiming benefit of PCT/IB2015/053679, filed on May 19, 2015, claiming the benefit of South Africa Application No. 2014/03628, filed on May 19, 2014, each of which is incorporated herein by reference in its entirety.

BACKGROUND OF THE INVENTION

This invention relates to the treatment of water. It relates in particular to a method of treating water, to water treatment apparatus, to a water treatment installation, and to a holder for use in the installation.

Dry calcium hypochlorite, as a source of chlorine, is considered to be one of the most versatile disinfectants on the market due to its efficacy and, in particular, the relative harmlessness of its inert residues once it is dissolved in water. However, in practice, calcium hypochlorite has two particular technical drawbacks. A first drawback is that it is highly soluble in comparison to organic chlorine derivatives (eg cyanuric acid-based chlorine), which means that its effective, consistent application into a water stream must by definition take into account the need to limit or carefully control the interface where it comes into contact with water. Generally speaking, all commercially successful calcium hypochlorite dispensing systems therefore operate at atmospheric pressure using some form of bypass mechanism where a concentrated solution is produced and then reintroduced back into a main flow or larger body of water. When main water flow stops it is necessary to ensure that no further contact between the calcium hypochlorite and water takes place until the water flow is restarted again. A second important drawback or limitation is the propensity of calcium hypochlorite to deposit its inert residues as crystalline scale over time. This scale compounds until it either blocks water flow channels, apertures and piping, or forms a less-soluble crust on the outer surface of un-dissolved material, thus interfering with dissolution rate over time.

The Applicant is also aware of water treatment apparatus in which water to be treated is sprayed upwardly against the lower surface of a bed of calcium hypochlorite tablets or briquettes protruding from a roof of an enclosed treatment vessel, with the lowermost calcium hypochlorite tablets or briquettes, i.e., the calhypo material, resting on a mesh base; the water spray dissolves chlorine from the lowermost material, with the resultant dosed water dripping or flowing downwardly into a body of water in the vessel, thereby treating the water with the chlorine. In other words, in this first iteration, the water/calcium hypochlorite interface is indirect and, importantly, by definition only a portion of the water entering the vessel will make contact with the calhypo raw material.

The Applicant is also aware of other apparatus in which the lower end portion of the calhypo tablet/briquette bed is submerged in the body of water in the treatment vessel, with water treatment taking place by water moving linearly, i.e. entering the treatment vessel at a first point at the level of the calhypo material located on a mesh bed, flowing linearly downwardly and then exiting at the lowermost point of the treatment vessel at a second point spaced from the first point, e.g. opposite thereto. Thus, a body of water flows in a steady and generally 'passive' manner over and through the bed of tablets/briquettes. Thus, in this second iteration, while the contact interface between water and chemical is more direct than in the first iteration, it is the linear passive flow of this body water that abrades the chemical material. Again, not all the water entering the vessel makes direct contact with calcium hypochlorite.

However, both these types of apparatus are relatively complex; accurate and constant dosage of the water is difficult due to both the upward and downward movement of water in the cartridge being linear, i.e. in the direction of the cartridge axis; clogging of the mesh openings with insoluble tablet residue is common; and bridging/fusing of tablets occurs once they get wet, form a mush-like crust and fuse together when the system is not in use, thereby preventing tablets from gravitating down onto the mesh base and hence contributing to uneven dosage.

It is thus an object of this invention to provide apparatus whereby these drawbacks are addressed.

BRIEF SUMMARY OF THE INVENTION

According to a first aspect of the invention, there is provided a method of treating water, which includes
  directing a stream of water towards a lateral side of a water treatment substance body contained within a holder with the water stream serving to abrade the water treatment substance body, thereby to dose the water with the water treatment substance such that dosed water is formed; and
  allowing the dosed water to pass through at least one opening in the holder.

In one embodiment of the invention, the directing of the stream of water towards the lateral side of the water treatment substance body, may be effected below the surface of a body of water, with the holder thus being immersed at least partly in the body of water. The dosed water that passes through the opening in the holder will then enter the body of water so that the body of water is thereby treated with the water treatment substance.

The body of water may be provided on a pan located below the holder, with dosed water that accumulates on the pan then passing through an outlet into another body of water, in a compartment below the pan.

However, in another embodiment of the invention, the holder may be located above a body of water to be dosed so that dosed water passing through the holder opening then cascades or spurts downwardly into the body of water.

The water stream may be a jet of water e.g. as generated by a nozzle.

The water stream or jet thus directly and actively abrades the water treatment substance body, thereby causing the water treatment substance to be released into the water.

The water treatment substance body may comprise a vertical column or a bed of water treatment substance particles, e.g. granules, pellets, briquettes or the like, contained in the holder, with the jet of water thus being directed towards a lateral side of a lower portion of the body which is then submerged, i.e. located below the surface of the body of water, or located above the body of water. In other words, the water jet is directed towards a lower side of the column or bed of water treatment substance particles. Accordingly, the water jet is not directed upwardly towards the bed. In particular, the water jet may be directed towards the lower side of the bed in a more-or-less horizontal direction. The holder may thus be in the form of a cartridge containing the bed of water treatment substance particles.

The water jet may be directed from outside the holder towards a water access opening in the holder adjacent to or in proximity to the lower side of the bed. Instead, the water jet may be directed from a lateral side of the holder towards or against the lower side of the bed.

The body of water may be contained in a vessel, and the method may hence include withdrawing treated water from the vessel, preferably on a continuous basis.

The method may include simultaneously directing such jets of water towards a plurality of the holders, with the holders being arranged so that a swirling or rotational movement is thereby indirectly imparted to the body of water. In this particular way, the method thus differs from the iterations mentioned hereinbefore in that the water flow through the vessel is not linear but instead is generally rotational. In particular, it may enter at a side of the vessel, then rotate within the body of water for a period before exiting vertically through an aperture in a floor of the vessel. The Applicant believes that this will assist in accurate and consistent dosing of the dosed water, and hence treatment of the body of water.

The method may include controlling the level of the body of water in the vessel through vertical adjustment of the height of an exit pipe/aperture, typically a central or an off-central exit pipe/aperture, in the vessel floor.

According to a second aspect of the invention, there is provided water treatment apparatus, which includes
  a water treatment vessel providing a water treatment zone;
  a holder for holding a water treatment substance body, and with at least one dosed water opening being provided in the holder such that dosed water can pass from the holder into the vessel; and
  waterstream generating means inside the vessel, for generating a stream of water and directing it towards a lower end portion of the holder in a direction transverse to a longitudinal or vertical axis of the holder.

The water treatment zone of the water treatment vessel may, in use, contain a body of water. The holder, which may then be an elongate or longitudinal holder, will then be positioned or arranged such that at least the lower end portion of the holder is immersed in the body of water, with at least a lower portion of a water treatment substance body held in the holder then also being submerged.

The vessel may include a pan located below the holder, and an outlet, preferably a raised outlet, in the pan through which dosed water which accumulates on the pan can pass into a lower compartment of the vessel.

The holder may contain a column or bed of water treatment substance particles, as hereinbefore described. The holder may be cylindrical form. The holder is refillable, e.g. by means of a funnel or chute. The holder may be removably located in the vessel. A plurality of the holders may be provided. The holders may then be arranged such that, in use, of all water entering the vessel can be harnessed if necessary in order to derive the maximum mechanical abrasive force possible to ensure that the tablets/briquettes are dissolved cleanly and effectively, with no risk of inert residues accumulating in the bottom of the holder where it can block apertures, interfere with flow or dissolution or allow for tablet coagulation and/or fusion when the apparatus is dormant. In addition, the position of the streams and holders may be such that they indirectly impart a swirling or rotational movement to the body of water in the vessel. For example, three of the holders, spaced apart and located more-or-less the same distance from a side of the vessel may be provided. A water stream or jet generating means will thus be provided for each of the holders. The water jet generating means may each comprise a nozzle arranged so that, in use, it directs the jet of water more-or-less orthogonally to the longitudinally extending axis of its associated holder. Thus, when the holders are located vertically, which will normally be the case, the nozzles will, in use, direct their water jets more-or-less horizontally.

Each holder may comprise a cylindrical sleeve or circular wall with the bed of water treatment particles located inside the sleeve or wall. In a first embodiment, a transverse trough may be provided at the operatively lower end of the sleeve or wall, with a water access opening or nozzle mounting opening being provided at one end of the trough, and with a plurality of the dosed water openings being provided in side walls of the trough towards its other end. In use, the bed of particles will rest in the trough and extend up the sleeve or wall. As lowermost particles are consumed, fresh particles move downwardly into the trough.

In a second embodiment, a transverse trough may be provided at the operatively lower end of the sleeve or wall, with a water access opening, or nozzle mounting opening, being provided at one end of the trough and with a plurality of the dosed water openings being provided in at least one of the side walls of the trough at or adjacent that end of the trough, i.e. the end of the trough having the water access opening or nozzle mounting opening. These openings may be in the form of a mesh or grid that prevents tablets/briquettes from becoming jammed directly up against the nozzle or water flow aperture. In other words, parts of the trough side walls adjacent the water access opening/nozzle mounting opening may be foraminous.

In a third embodiment, a basket, provided with a plurality of openings, may be provided at the operatively lower end of the sleeve or wall. Typically, the basket will be of cylindrical form having a foraminous or mesh-like peripheral side wall and a solid base. In use, the nozzle will then be arranged so that the water jet impinges against the side wall of the basket. Importantly, the jet will be located in such a way to ensure that all of the water entering the vessel will participate in abrading/dissolving the calcium hypochlorite.

The water treatment vessel may comprise a base or floor, a roof spaced from the base, and a side wall extending peripherally between the base and the roof. Typically, the water inlet will be provided in the side wall. In particular, the base and the roof may be circular, with the side wall thus being of annular or cylindrical form.

Instead, e.g. in the embodiment of the invention in which the vessel includes the pan, each holder may include a funnel or chute as hereinbefore described, a circular wall depending from the funnel outlet, and the trough attached to the operatively lower end of the wall. A plurality of the holders may then be provided, with the holders being spaced apart around the vessel. Each funnel may be more-or-less triangular in plan view, with the funnels being arranged side-by-side with their apices meeting at the centre, i.e. at the longitudinal axis, of the vessel.

The pan may then include a raised circular central portion so that a concentric trough or recess is defined around the central portion. In use, insoluble inerts and residues will accumulate in the trough. If desired, at least one concentric furrow may be provided in a floor of the trough. The furrow may be more or less V-shaped in cross section. The furrow may have a relatively steep inner side, e.g. a vertical inner side i.e. the side closest to the centre of the vessel, and a more gently sloping outer side, i.e. the side further from the vessel centre.

The pan may have an outlet for discharging dosed water. The outlet may be a raised outlet i.e. raised above the trough floor. The outlet may be provided by a cylindrical weir with its opening being located further from the trough floor than the raised central portion. Still further, a discharge pipe, whose upper end provides a dosed water discharge opening, may be adjustably or movably mounted in the weir opening or outlet. Thus, by adjusting the position of the pipe, the level of the body of dosed water on top of the pan can be adjusted, e.g. to ensure that the dosed water openings of the holder are covered by the body of water.

The sleeves of the holders may each be provided with at least one outwardly projecting lug which engages a corresponding recess in the roof. A plurality of such lugs, spaced apart peripherally, may be provided. Thus the holder is prevented from rotating relative to the vessel, thereby automatically aligning its associated nozzle correctly with the lower end of the holder, and also fixing the depth to which the holder protrudes into the vessel, again thereby ensuring that the lower end of the holder is aligned correctly relative to its associated nozzle.

The particles may comprise calcium hypochlorite as the water treatment substance. Instead, however, they may comprise any other suitable water treatment substance.

As hereinbefore set out, each water generating means may comprise a nozzle, with the nozzle being arranged such that, in use, they each direct a jet of water in a more-or-less horizontal direction. In a first embodiment of the invention, the nozzles may be located outside their associated holders, with each holder then having the water access opening through which the jet of water generated by its associated nozzle enters the holder. However, in another embodiment of the invention, the nozzles may be located inside the holders and be mounted to the lower ends of the holders by extending through the nozzle mounting openings.

The nozzles may be connected to an inlet water pipe leading from the side of the vessel.

The apparatus may also include a treated water outlet leading from the vessel. Control means, for controlling the level of water in the vessel, may also be provided. The control means may be the same as, or similar to, that of South African Patent No. 98/10329, which is hence incorporated herein by reference thereto. However, this invention represents an improvement on that of ZA 98/10329 in that it applies direct mechanical abrasive pressure to the tablets in the form of potentially all of the incoming water flow, whereas ZA 98/10329 relies on the speed of a passively rotating body of water to dissolve tablets held within disposable plastic cartridges.

In another embodiment of the invention, the apparatus may include a bulk container for holding a bulk supply of the water treatment substance particles, with the holders then depending or protruding from the bulk container. In use, the bulk container will hold a bulk supply of the water treatment substance particles, from which the holders will automatically be replenished, by means of gravity, as the particles in the holders are consumed.

The invention extends also to a holder as hereinbefore described.

According to a third aspect of the invention, there is provided a water treatment installation, which includes
  water treatment apparatus according to the second aspect of the invention, and comprising at least one holder containing a water treatment substance body; and
  a water conduit connected to an inlet water pipe of the apparatus.

BRIEF DESCRIPTION OF THE DRAWINGS

The invention will now be described in more detail with reference to the following diagrammatic drawings
In the drawings.

DETAILED DESCRIPTION OF THE INVENTION

Figure 1:
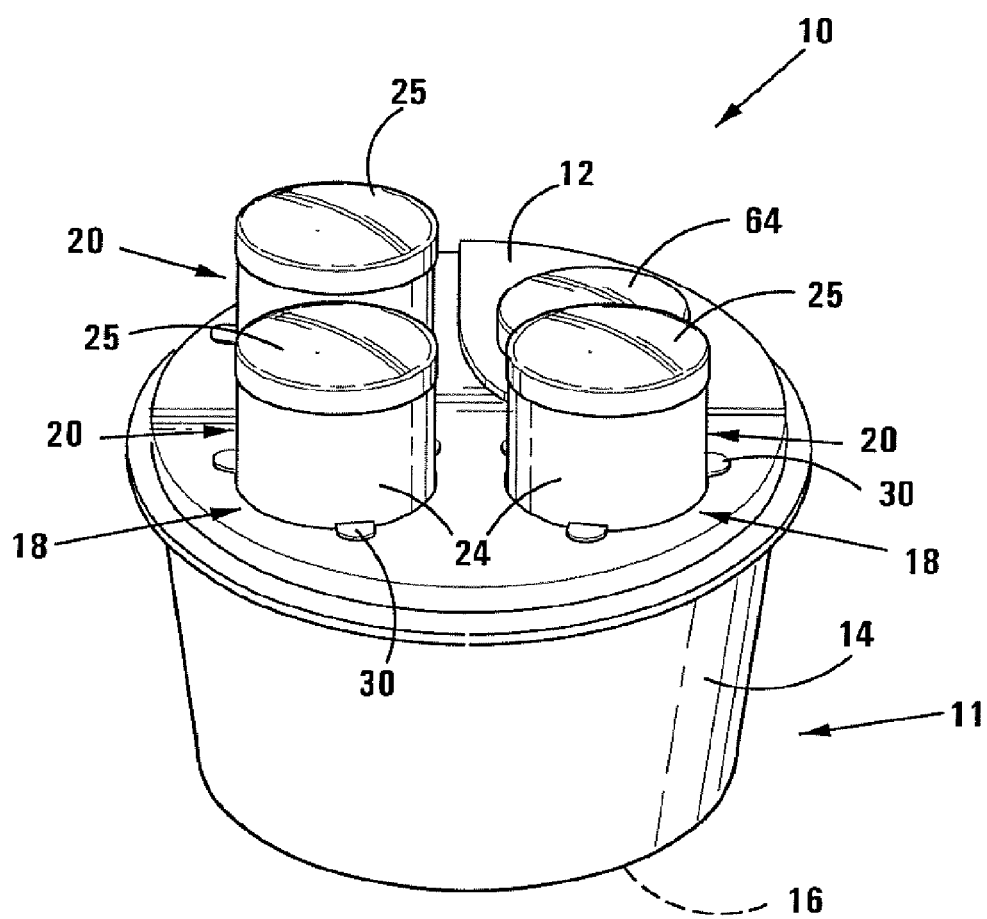
FIG. 1 shows a three-dimensional view of water treatment apparatus according to one embodiment of the invention.
Figure 2:
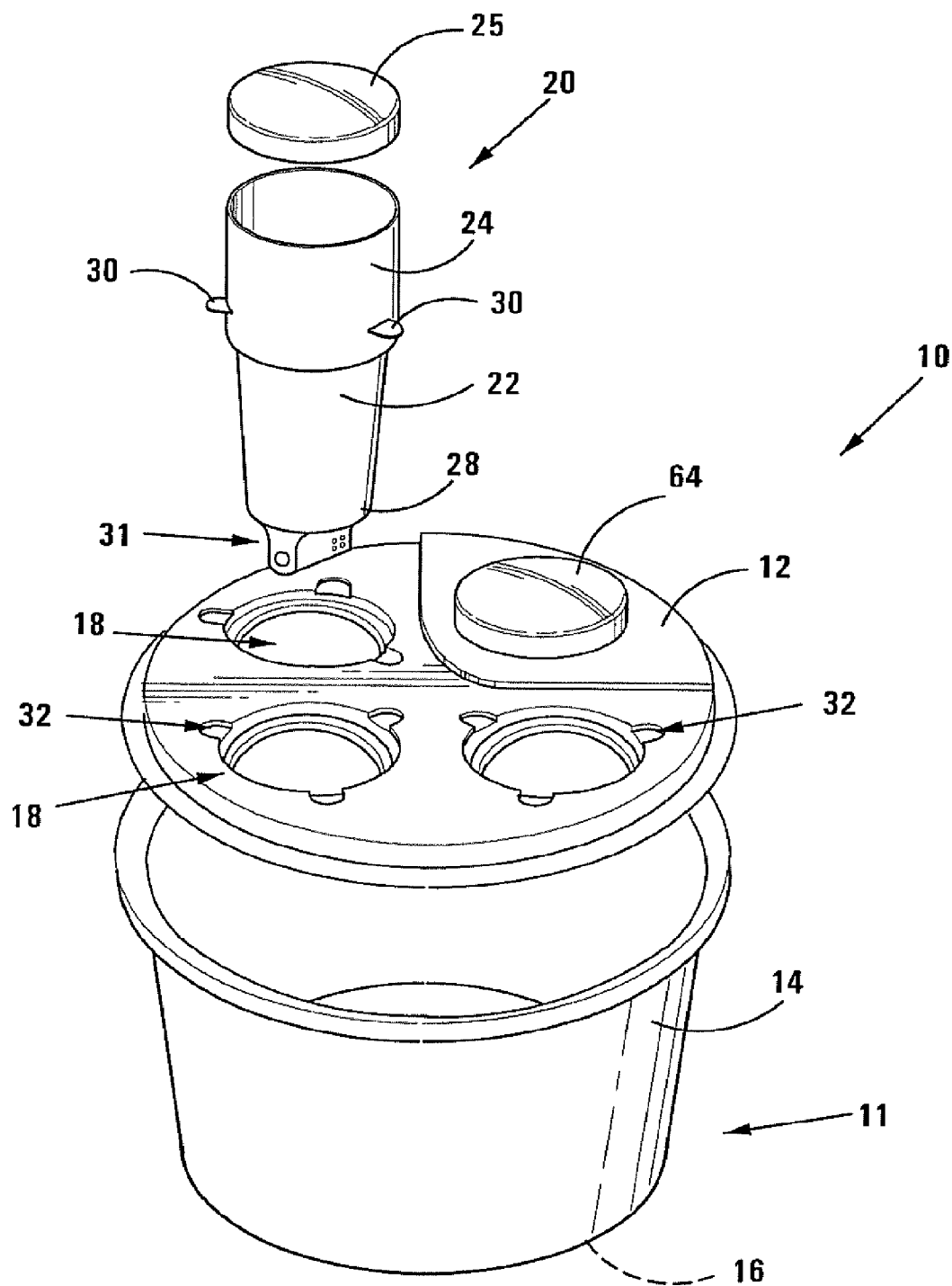
FIG. 2 shows the apparatus of FIG. 1 in exploded view, with some details omitted.
Figure 3:
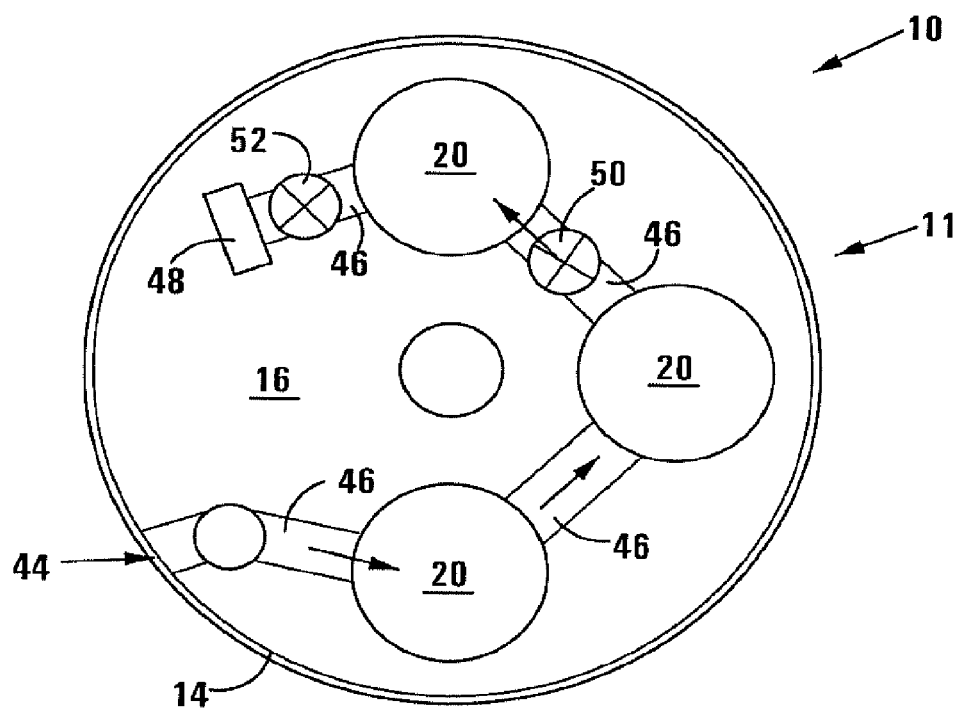
FIG. 3 shows, schematically, the internal arrangement of the apparatus of FIG. 1.
Figure 4:
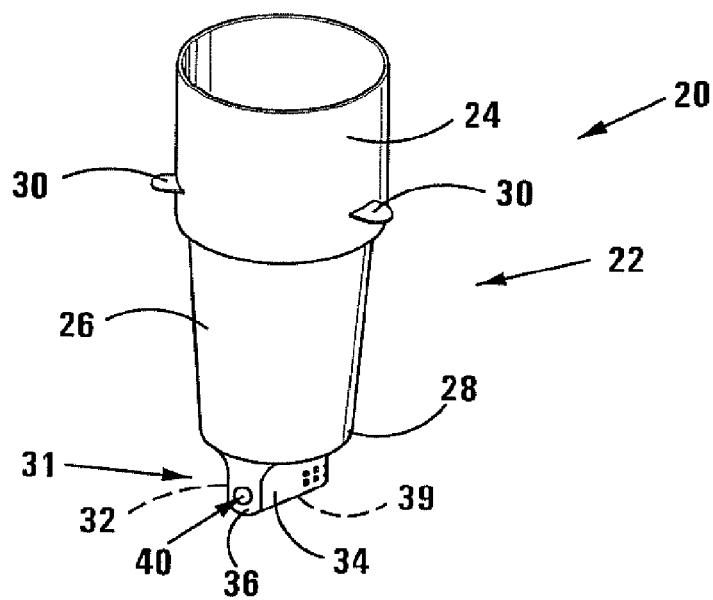
FIG. 4 shows a three-dimensional view of one of the cartridges of FIG. 1.

Referring to FIGS. 1 to 6, reference numeral 10 generally indicates water treatment apparatus according to one embodiment of the invention.

The water treatment apparatus 10 includes a vessel 11 having a circular roof 12 in the form of a lid which fits snugly over the upper end of a cylindrical wall 14 whose lower end is closed off with a base 16.

Four circular openings 18 are provided in the roof 12. The openings 18 are spaced equidistantly apart from one another and are also spaced the same distance from the perimeter of the roof 12. Three of the openings 18 accommodate a holder, generally indicated by reference numeral 20.

The wall 14 of the vessel 11 tapers downwardly from the roof 12 to the base 16. This facilitates transport of the vessel 11 since a number of the vessels 11 can then be stacked one within another for transport purposes.

Each holder 20 comprises a cylindrical sleeve, generally indicated by reference numeral 22. The sleeve 22 comprises an upper section 24 of constant diameter as well as a lower section 26 which tapers downwardly from the upper section 24 to a lower end portion 28. The upper end of each holder is closed off with a lid 25 which fits snugly over the upper end of the holder section 24.

Three lugs 30, spaced equidistantly apart, protrude from the upper cylindrical section 24, towards its lower end. The lugs 30 fit into recesses 32 in the roof 12. It will be appreciated that, by means of the lugs 30/recesses 22, each holder 20 is prevented from rotating relative to the vessel 11 when the lugs are engaged with the recesses. Furthermore, by means of the lugs 30/recesses 32, the depth to which the holders 20 protrude into the vessel 11 is fixed. It will also be appreciated that the holders 20 are thus removably mounted located in the roof 12 of the vessel, and can thus readily be removed and replaced as necessary.

Figure 5:
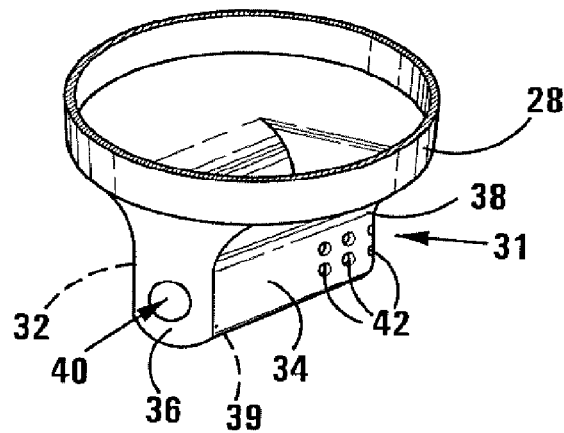
FIG. 5 shows an enlarged view of a bottom portion of the cartridge of FIG. 4.

The lower end portion 28 of each sleeve 22 is provided with a transverse trough 31. Each trough 31 comprises a pair of sides 32, 34 which taper towards each other from a broad trough end 36 to a narrower trough end 38. The trough 31 has a base 39 which slants downwardly from the trough end 36 to the trough end 38. At the trough end 36 is provided a water access opening/nozzle mounting opening 40, while towards the other end 38 are provided, in the trough side walls 32, 34, a plurality of dosed water outlet openings 42 sized and arranged as shown in FIG. 5.

A plurality of calcium hypochlorite pellets or prills (not shown) are provided inside each sleeve 22 and thus rest in the trough 31. The pellets or prills are thus in the form of a bed contained within the sleeve 22.

Preferably, the sleeves 22 of the holders are of natural or transparent plastic material, so that the levels of the beds of pellets within the sleeves can be monitored. Thus, this will facilitate knowing when all the pellets have been consumed so that the holders must be refilled with pellets.

Naturally, for a particular application, a greater or lesser number of holders 20, e.g. two or four, can be used, depending on the volume of water to be treated, the treatment levels required, etc. The apparatus 10 is thus versatile in this regard since the spare openings in the vessel roof can merely be closed off with one of the covers 64.

A water inlet 44 is provided in the vessel wall 14 with a water pipe 46 leading from the inlet 44 below each of the holders 20. The far end of the pipe 46 is closed off with an end piece 48, and bleeder valves 50, 52 are provided in the pipe 46 on either side of the furthest holder 20.

Figure 6:
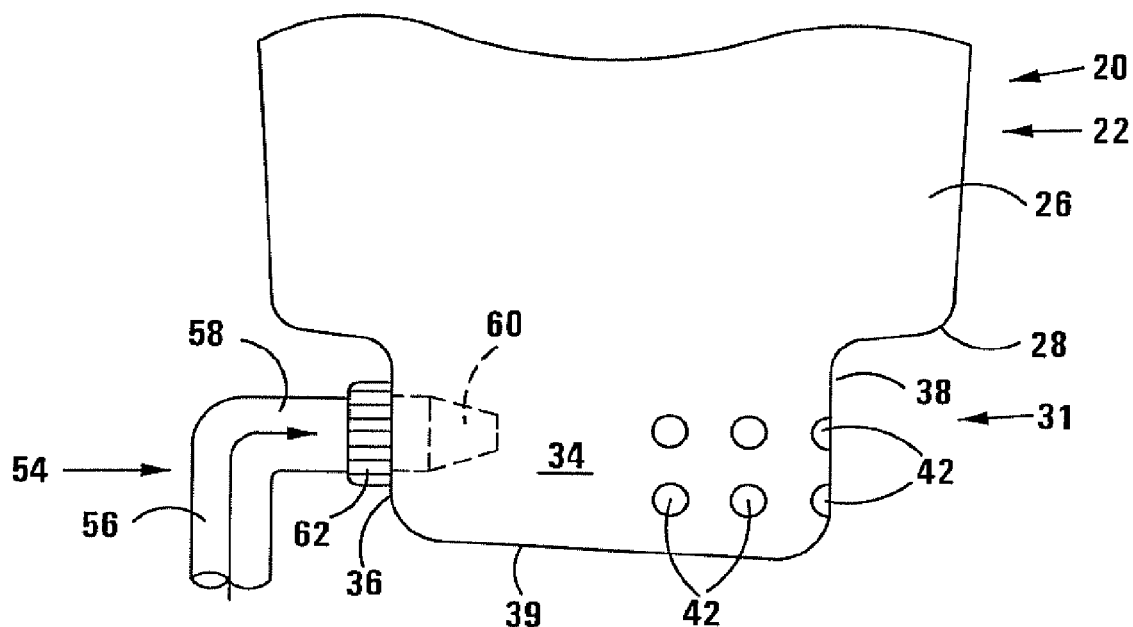
FIG. 6 shows an enlarged side view of a bottom or lower portion of the cartridge of FIG. 4, with its nozzle attached to it.

Below each holder 20, an L-shaped pipe 54 protrudes upwardly from the inlet pipe 46. Each pipe 54 thus includes an upwardly extending leg 56 and a leg 58 extending at right angles to it. At the free end of the pipe 58 is provided a nozzle 60, with the nozzle 60 being directed towards the water access opening 40 of the trough 31. However, in another version of the invention as shown in FIG. 6, the pipe leg 58 is fixed to the end 36 of the trough 31 by means of a nut 62 which thus engages threads on the pipe leg 58, with the nozzle 60 then located inside the trough 31. It will be appreciated that, in this version of the invention, when all the calcium hypochlorite pellets have been consumed, the holder 20 is not removed but instead is merely refilled by removing its cover 25.

The fourth opening 18 in the roof 12 of the vessel serves as an inspection opening and is normally covered with a cover 64.

The vessel 11 is also fitted with a water outlet (not shown) which is typically provided in the wall 14, as well as with water level control means (not shown). The water level control means is typically one of the control means as described in South African Patent No. 98/10329, which is hence incorporated herein by reference.

In use, the vessel 11 will contain a body of volume of water to be treated, with the level of the volume of water being controlled such that the surface of the water extends partway up the sides of the sleeves 22 of the holders 20. Thus, the dosed water outlet openings 42 will be covered by the body of water i.e. will be located within the body of water. It will be appreciated that, by means of the water inlet pipe 46 and nozzles 60, water will continuously be introduced into the vessel 11, while treated water will continuously exit the vessel through the water outlet.

Fresh water, i.e. water to be treated, is directed, by means of the nozzles 60, as jets against or onto lower lateral sides of the beds of pellets resting in the troughs 31 and extending up the sleeves 22. The water jets are thus directed horizontally onto the pellets in the lower portions of the beds. The water jets impinging against the pellets directly and actively abrade or erode the pellets, causing the calcium hypochlorite therein to be released and to dissolve so that dosed water is produced. The dosed water exits the troughs 31 through the dosed water openings 42 into the body of water inside the vessel 11, thereby treating the water.

In the apparatus 10, fresh water flow into and dosed water flow out of the holders 20 are not both linear, i.e. are not both in an axial direction relative to the holder or sleeve axis. Thus, in the apparatus 10, water flow into the holders is transversely to, and specifically orthogonally to, the axes of the holders with only water flow out of the holders being linear. The Applicant believes that this will substantially facilitate the dosed water openings remaining unclogged by solid residue from the pellets.

The bleeder valves 50, 52 provide an adjustment mechanism to slow down the flow rate of the water in the pipe 46 near the third cartridge 20, thereby providing a means for adjusting the water flow rate to the nozzle 60 of the third holder 20.

It will be appreciated that the apparatus 10 will normally be mounted on top of a main reservoir of water to be treated, with the vessel water outlet thus discharging dosed water into the main reservoir. The installation will then include a series of control valves and an in-line flow measurement device, e.g. a rotameter, to allow a user to monitor and adjust dosed water flow from the apparatus on demand. Instead, the apparatus 10 can be mounted to a base mixing reservoir in which dosed or treated water is collected before being pumped or withdrawn, e.g. by means of a venturi, into either a main water line or directly onto agricultural produce. In addition to then including control valves and a rotameter as described, the installation will then typically include a cistern valve inside the base reservoir to regulate the water level in the base reservoir, and, optionally, a pump for injecting dosed water into the main water line. If desired, electronic control and measurement mechanics can also be provided, for automatic control.

Figure 7:
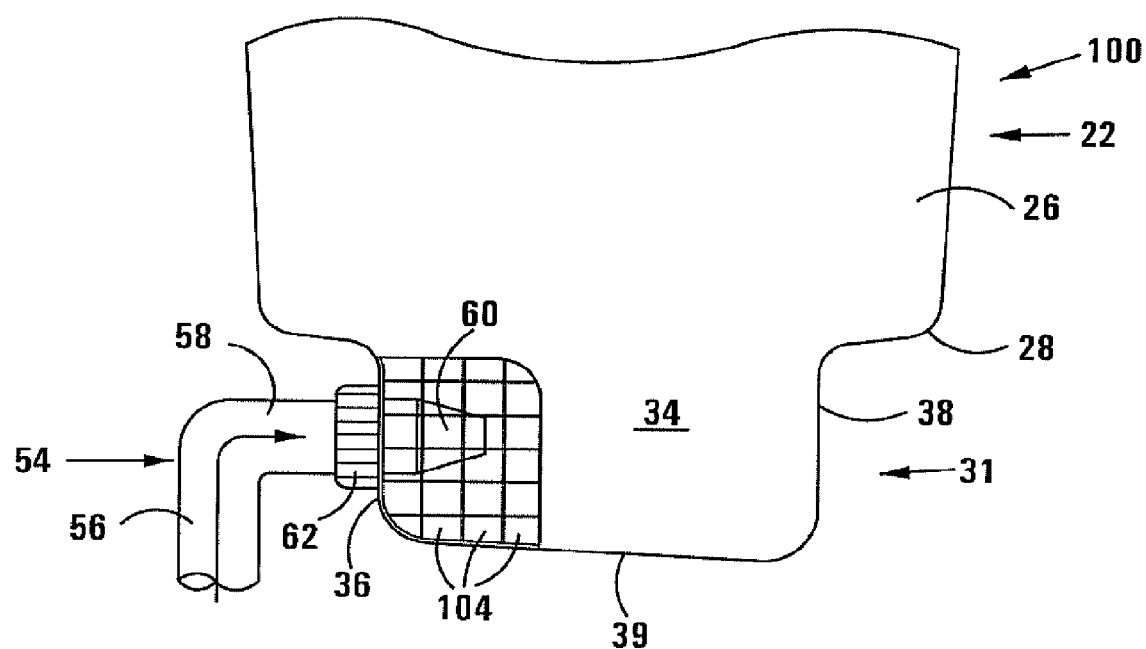
FIG. 7 shows an enlarged side view, similar to that of FIG. 6, of a bottom portion of a cartridge according to another embodiment of the invention.

Referring to FIG. 7, reference numeral 100 generally indicates a holder according to another embodiment of the invention.

The holder 100 also includes a sleeve 22 having a lower tapering sleeve section 26 and a trough 31 at the lower end of the sleeve sections 26.

In the holder 100, instead of the trough 31 being provided with the dosed water openings 42, side wall portions 102 of the trough sides 32, 34, in proximity to the nozzle 60, are foraminous or mesh-like, providing a plurality of dosed water openings 104.

The holder 100 functions in exactly the same manner as the cartridge 20.

Figure 8:
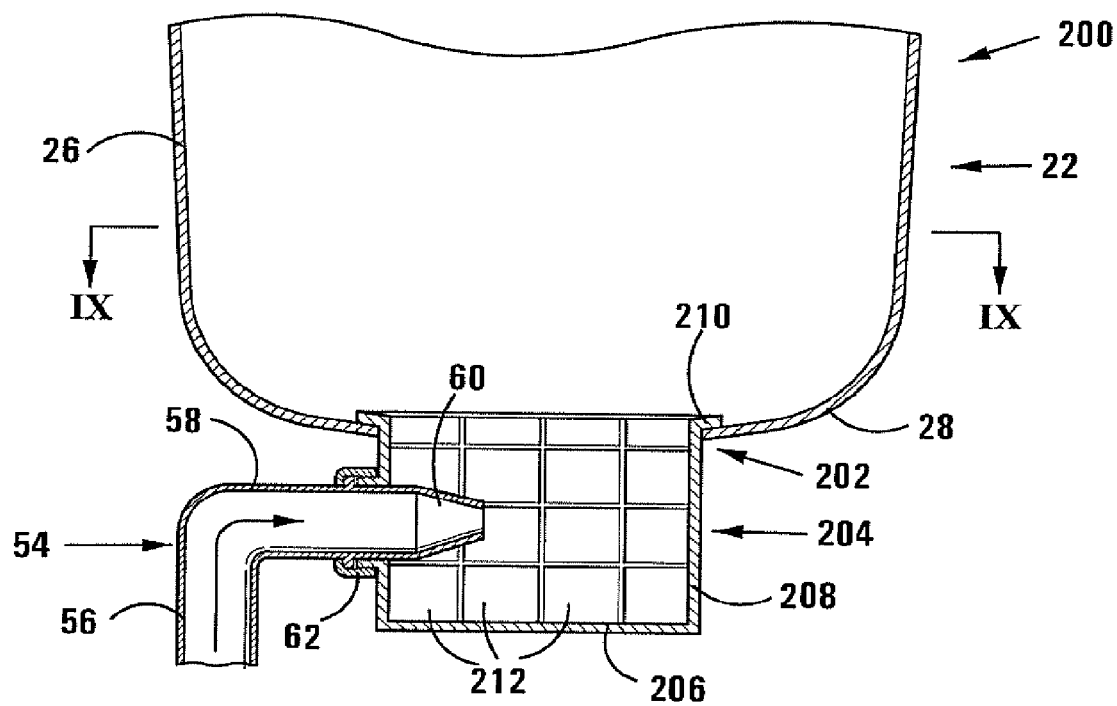
FIG. 8 shows an enlarged side view, similar to that of FIG. 6, of a bottom portion of a cartridge according to yet another embodiment of the invention.
Figure 9:
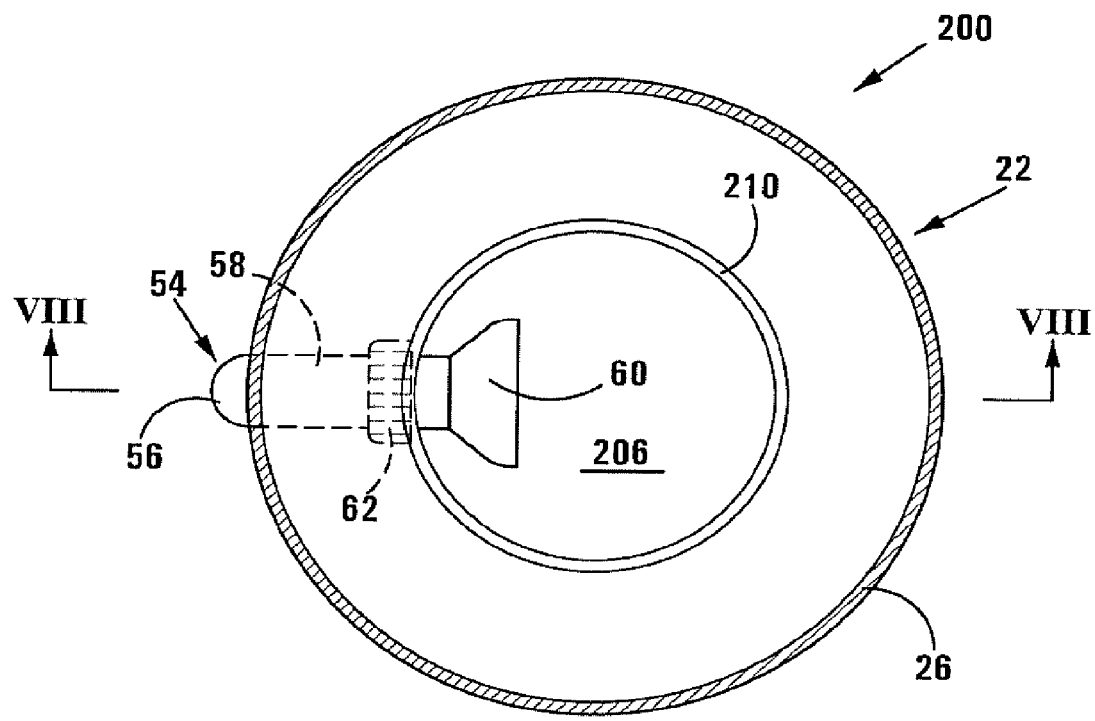
FIG. 9 shows a plan view of the cartridge of FIG. 8.

Referring to FIGS. 8 and 9, reference numeral 200 generally indicates a holder according to yet another embodiment of the invention.

The holder 200 is similar to the holder 10 and thus also includes a sleeve 22 having a tapering lower sleeve section 26. At the lower end 28 of the holder 200, a central circular opening, generally indicated by reference numeral 202, is provided.

The holder 200 also includes a basket, generally indicated by reference numeral 204. The basket 204 includes a solid circular base 206 and a foraminous cylindrical side wall 208 protruding upwardly from the base 206. The foraminous side wall 208 thus provides a plurality of dosed water openings 212. An outwardly protruding peripheral flange 210 is provided around the upper edge of the wall 208, with the flange 210 serving to locate the basket 204 in position within the opening 202 as shown in FIG. 8.

In FIG. 8, the nozzle 60 is shown located outside the basket 204, with its nozzle opening 212 being of horizontal elongate shape, as shown most clearly in FIG. 9.

In use, the jet of water exiting the nozzle 60 thus impinges against the wall 208 of the basket 204 and hence against the calcium hypochlorite pellets held in the basket. Treated water exits through the mesh openings into the body of water in the vessel.

In another embodiment of the invention (not shown), the apparatus 10 may include, adjacent (e.g. immediately below) its roof 12, a bulk container for holding a bulk supply, e.g. 50-100 kg, of the calcium hypochlorite pellets. The holders 20 will then depend from a base of the bulk container. It will be appreciated that the holders 20 will automatically be replenished, by means of gravity, with pellets from the bulk container as the pellets in the holders are consumed. It is envisaged that the apparatus according to this embodiment will be used for treating larger volumes of water. Typically, 2 to 5 of the holders 20 can then be provided.

The Applicant believes that the water treatment apparatus 10, provide significant advantages over existing water treatment apparatus of which it is aware, including the following:

due to the arrangement of the holders 20, 100, 200 and the nozzles 60, a swirling or rotational movement is imparted to the body of water in the vessel 11, with this swirling or rotational water movement assisting in calcium hypochlorite dissolving evenly and consistently without clogging of dosage openings taking place;

by means of the more-or-less horizontally directed jets of water impinging against or directed towards the sides of the beds of calcium hypochlorite pellets, coupled to the relatively small sizes of the pellets which are thus randomly orientated within the bed rather than being arranged in a specific orderly stacked fashion, consistent dosage of calcium hypochlorite into the water is achieved, e.g. bridging of tablets thereby preventing upper tablets entering the trough/basket does not readily occur;

as a result of the water jets impinging directly and actively against the lateral sides of the beds, there is little or no clogging of the dosed water openings, since the outer layers (including inert residues) are stripped off by direct hydrodynamic force and scale cannot readily form in the dosed water openings since they are continually blasted open by the water jets; any sediment that forms ends up in the bottom of the trough/basket and does not impede either water flow through the dosed water openings or the action of the water jet on the calcium hypochlorite tablets in the bed;

due to the force of the water from the jets, calcium hypochlorite is continually dissolved from the lowermost pellets, and as the lowermost pellets are consumed, new pellets readily pass from the upper regions of the bed to the lower portions thereof;

the water jets impinge directly onto the tablets at the lower end of the bed of pellets, thereby ensuring consistent and accurate water dosage;

the tapered bases 39 of the troughs 31 ensure that, when the apparatus is not in use, water can drain from the trough 31 through a drainage opening (not shown) provided at the lower end of the bases 39.

Figure 10:
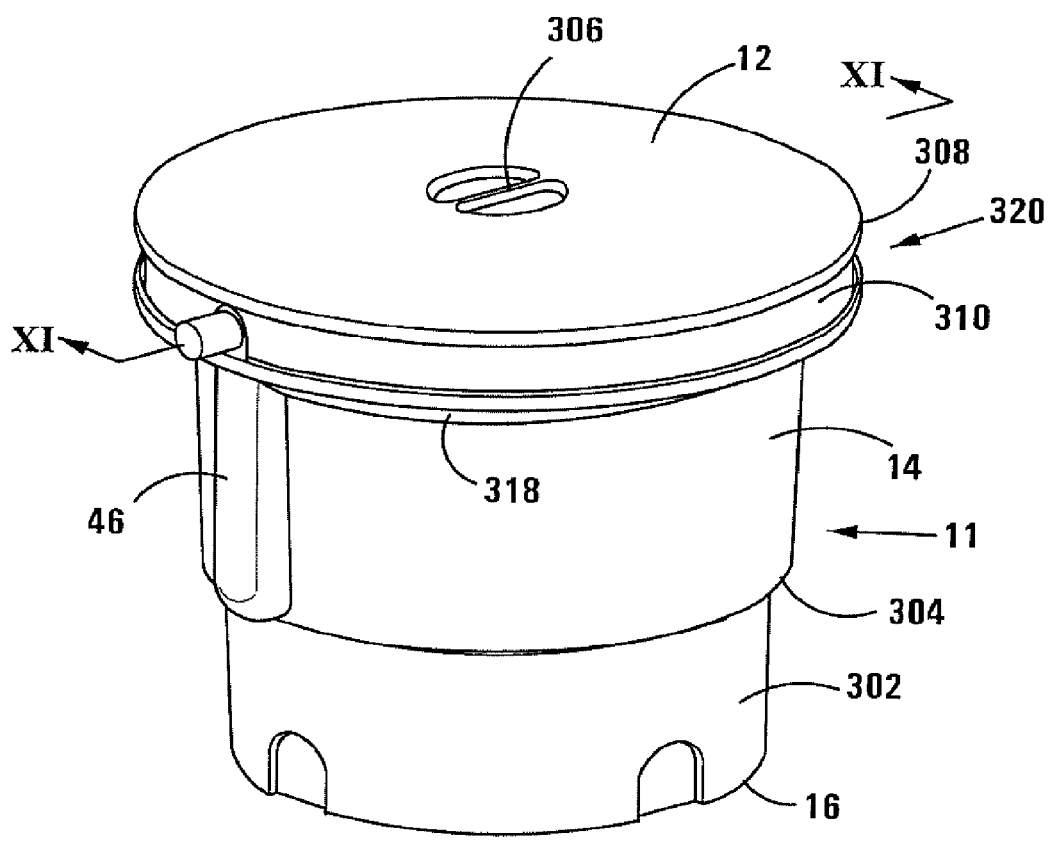
FIG. 10 shows a tree-dimensional view of water treatment apparatus according to another embodiment of the invention.
Figure 11:
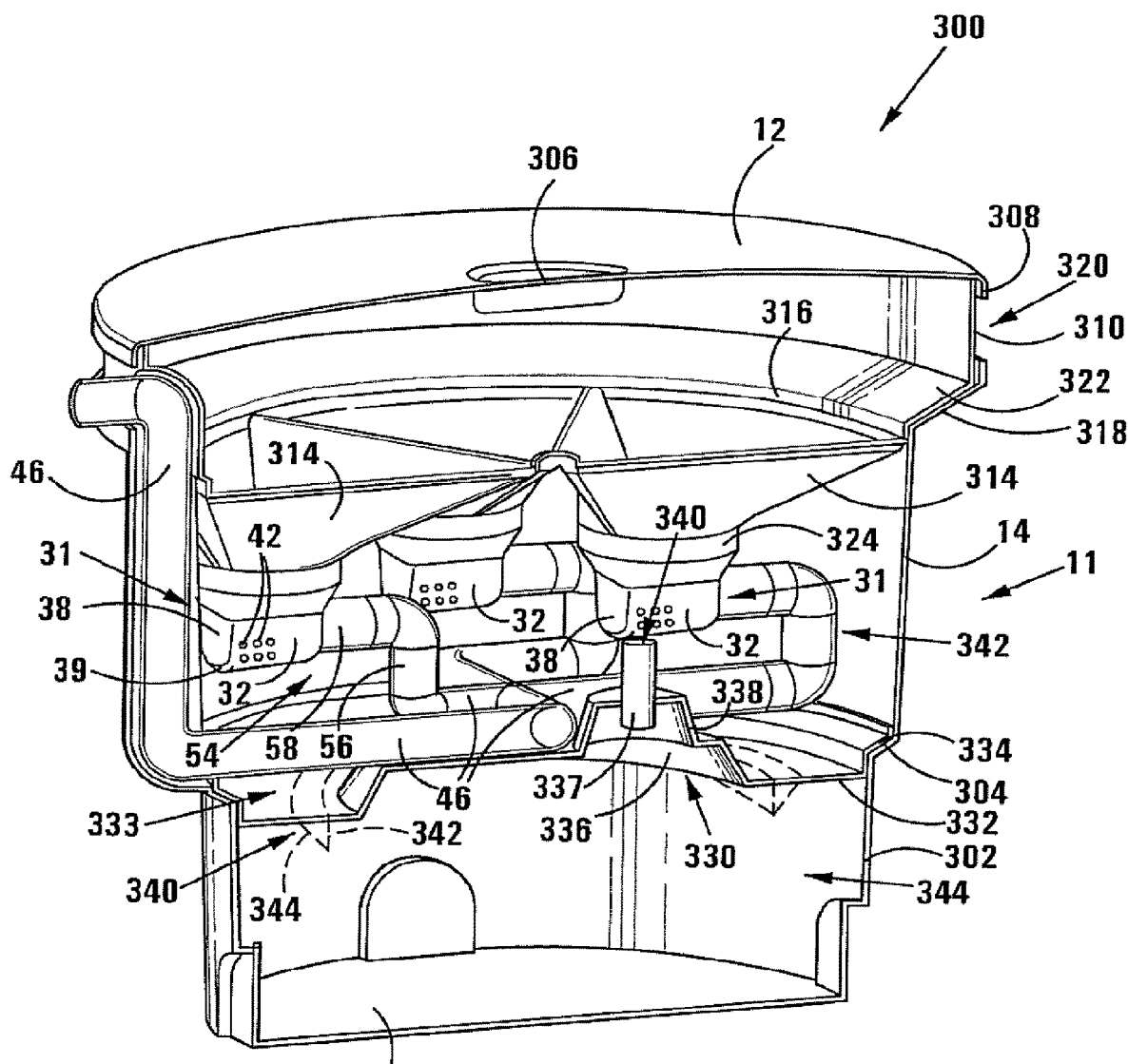
FIG. 11 shows a longitudinal sectional view through XI-XI in FIG. 10.
Figure 12:
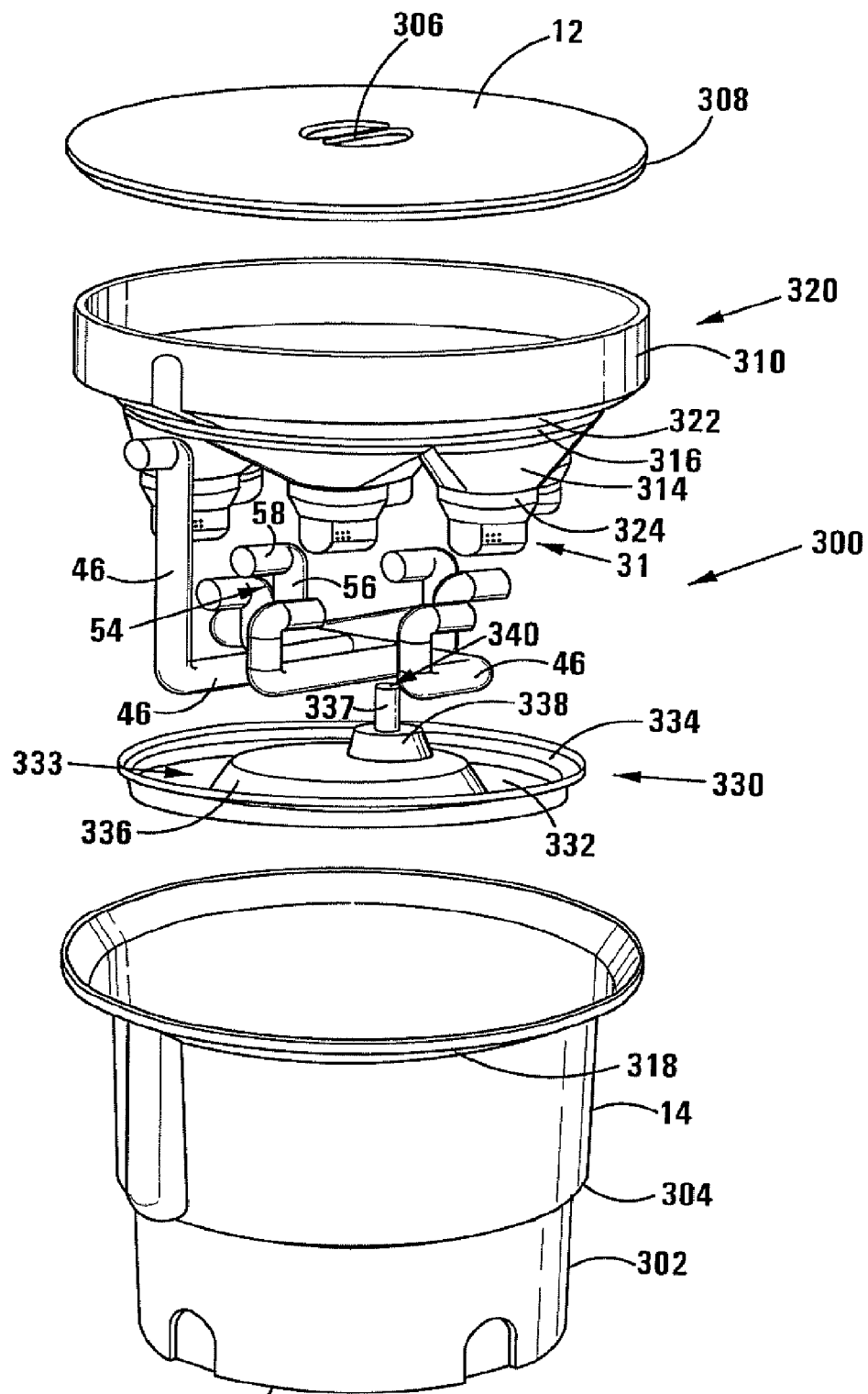
FIG. 12 shows an exploded view of the water treatment apparatus of FIG. 10, with some detail omitted for clarity.

Referring to FIGS. 10 to 12, reference numeral 300 generally indicates water treatment apparatus according to another embodiment of the invention.

Parts of the apparatus 300 which are the same or similar to those of the apparatus 10 hereinbefore described with reference to FIGS. 1 to 9, are indicated with the same reference numerals.

The vessel 11 of the apparatus 300 includes another cylindrical wall 302 below the cynlindrical wall 14 and being of slightly smaller diameter so that a peripheral inwardly extending shoulder 304 is defined between the lower end portion of the wall 14 and the upper end portion of the wall 302. The base 16 closes off the lower end of the wall 302.

The lid 12 of the apparatus 300 includes a central handle 306 to facilitate removing and replacing the lid. The lid 12 also includes a peripheral flange 308 which fits over the upper end of a cylindrical wall 310, the purpose of which is described in more detail hereunder.

The apparatus 300 includes six water treatment substance holders 312, arranged in two banks of 3 holders each. Each holder 312 includes a more-or-less triangular (when seen in plan view) funnel or chute 314, with all the funnels 314 protruding radially inwardly from a lower peripheral edge portion 315 of a filler arrangement, generally indicated by reference numeral 320. The filler arrangement 320 also includes a circumferential shoulder piece 322 flaring upwardly outwardly from the edge portion 316 to the cylindrical wall 310. The apices 324 of the funnels 314 meet at the vessel centre, i.e. at the vertical axis of the vessel, and the funnels 314 are arranged side by side so that they span the inside of the vessel 11. The shoulder piece 322 rests on an outwardly flowing shoulder 318 at the upper end of the wall 14.

At the lower end of each funnel 314 is provided a circular wall or cylinder 324 which tapers inwardly to one of the troughs 31. Each wall 324, together with its associated trough 31, thus defines a water treatment substance contact chamber.

For each of the troughs 31, there is also provided an L-shaped pipe 54 (having limbs 56, 58) leading from the inlet pipe 46, and ending in one of the nozzles 60. The nozzles 60 are fixed to the trough ends 36 so that they are not visible i.e. they protrude through the nozzle mounting openings of the troughs.

The apparatus 300 also includes a circular interstitial pan 330 located between the wall 14 and the wall 302 and spanning the inside of the vessel 11. The pan 330 includes a concentric floor 332 from the outer edge of which protrude upwardly outwardly a flange 334 which rests on the shoulder 304. A circular central portion 336 protrudes from the inner periphery of the floor 332. Thus, a concentric trough or recess 333 is defined around the raised central portion 336, with the floor 332 defining the floor of the trough or recess. A pipe 337, providing a water discharge opening 340, is adjustably mounted in an opening provided in an off centre cylindrical weir 338. Water can thus pass from an upper compartment 342 defined by the wall 14 to a lower compartment 344 defined by the wall 302, by means of the pipe 337. The water discharge opening 340 of the pipe 337 is typically located at the level of the bottoms of the troughs 31.

The apparatus 300 functions in similar fashion to the apparatus 10. The funnels 314 and contact chambers are filled with calcium hypochlorite pellets or prills which rest in the troughs 31. The pellets are abraded or eroded by means of water jets from the nozzles as in the case of the apparatus 10. Dosed water exits the troughs through the openings 42 and accumulates on the pan 330, typically up to a level above the uppermost openings 42 so that the lower end portions of the holders 312 are submerged in the body of water on the pan 330. The dosed water then flows through the pipe opening or outlet 340, into the lower compartment 344 from where it can be dosed (not shown) into a main water supply or the like.

It will be appreciated that the funnels 314 and contact chambers can readily be replenished with pellets simply by removing the lid 16 and filling the funnels 314.

It will also be appreciated that, in the apparatus 300, the troughs 31 are located above the body of dosed water located in the compartment 342 i.e. on the pan 330.

The pan 330 serves to prevent or inhibit dosed water exiting the openings 42 in the troughs 31 from cascading non-uniformly into the storage vessel or compartment 344. Such cascading could readily result in significant chlorine losses to atmosphere over time, and a higher likelihood of particulate insoluble matter (inherently present in calcium hypochlorite pellets) from being sucked directly into an outlet pipe (not shown) for withdrawing dosed water from the vessel 11 (which could be problematic in applications where such particles can accrue and clog up apertures elsewhere in a water system which is treated with the dosed water).

Thus, the interstitial pan 330 has the following features and functions:

it allows a body of water to form, with the body of water covering the contact chambers or troughs as well as the opening 42, when the apparatus is in use thereby permitting dosed, i.e. chlorinated, water and particulate matter exiting the contact chambers to join a swirling stream of water on the pan rather than cascading directly into the compartment 344;

the floor 332 of the pan 330 provides a "sacrificial" surface or which unwanted inerts and insoluble residues can accumulate rather than passing into the compartment 344—those residues can then be removed when the apparatus is cleaned.

if desired, at least one concentric V-shaped furrow 340 can be provided in the floor 332 of the pan 330 as shown in broken line in FIG. 11. The furrow 340 will then have a steeper inner side 342, e.g. a vertical inner side 342, and a more gently sloping outer side 344. Combined with the centrifugal outward swirl of the body of water in the compartment 342 (resulting, amongst others, from the two banks of troughs 31 being so arranged so that water exiting their openings 42 impart the swirling motion), the furrow will prevent or inhibit particulate matter from flowing directly into the weir opening or outlet 340 and hence into the compartment 344. Such particles thus accumulate in the furrow 340 where they hence have a larger residence time to promote dissolution thereof and from where, i.e. finally undissolved particles, can hence ultimately be removed when the apparatus is cleaned. A plurality of the furrows, e.g. 2 to 3, may be provided.

The invention claimed is:

1. A method of treating water comprising:
   directing, with a nozzle that is connected to a water inlet pipe, a jet of water towards a lateral side of a water treatment substance body, which comprises a bed of randomly oriented water treatment substance pellets comprising a water treatment substance, contained within a holder;

wherein the holder comprises:
      a cylindrical sleeve inside in which the bed of water treatment substance pellets is partly located; and
      a transverse trough at an operatively lower end of the cylindrical sleeve, the transverse trough comprising a pair of sides, said pair of sides tapering in laterally towards each other from a broad trough end to a narrower trough end, and a base that slants downwardly from the broad trough end to the narrower trough end, the transverse trough providing a water treatment zone, and wherein the transverse trough has:
         a water access opening provided at the broad trough end of the transverse trough, to direct water towards the lateral side of the water treatment substance body; and
         a plurality of dosed water openings provided in side walls at the narrower trough end of the transverse trough;
   wherein the holder is located vertically, with the cylindrical sleeve located above the transverse trough and with the water treatment substance body resting in the transverse trough and extending up the cylindrical sleeve such that the transverse trough contains the lowermost water treatment substance pellets of the water treatment substance body;
   wherein the nozzle is located:
      outside of the holder and is directed towards the water access opening such that the jet of water is directed from outside the holder towards and through the water access opening; or
      inside the holder, being mounted to the holder by extending through the water access opening, such that the jet of water is directed from a lateral side of the holder;
   wherein, with respect to the vertical location of the holder, the jet of water enters the transverse trough substantially horizontally through the water access opening; and
   wherein water of the jet of water simultaneously and continuously contacts and dissolves the water treatment substance from multiple water treatment substance pellets of the bed of water treatment substance pellets in the transverse trough;

consuming, in the transverse trough, the water treatment substance pellets cleanly by direct and active abrasion of the lowermost water treatment substance pellets with hydrodynamic forces of the jet of water in the water treatment zone, with exposed surfaces of the water treatment substance pellets being stripped off by direct hydrodynamic force and with the water treatment substance thereby being released in the water such that dosed water is formed by dissolution of released water treatment substance;

continually blasting the plurality of dosed water openings open with the jet of water; and replacing consumed water treatment substance pellets with fresh water treatment substance pellets that move downwardly into the transverse trough;

allowing the dosed water to pass through the plurality of dosed water openings in the transverse trough; and allowing water to drain from the transverse trough along the slanted base when the jet of water is not being directed into the transverse trough.

2. The method of claim 1, further comprising:
immersing at least the transverse trough in a body of water and directing the jet of water towards the lateral side of the water treatment substance body below the surface of the body of water; and
passing dosed water through the plurality of dosed water openings into the body of water, so that the body of water is thereby treated with the water treatment substance.

3. The method of claim 2, wherein the body of water is provided on a pan located below the holder, with dosed water that accumulates on the pan then passing through an outlet into another body of water in a compartment below the pan.

4. The method of claim 2, which includes simultaneously directing jets of water towards a plurality of the holders, with the holders being arranged so that a swirling or rotational movement is thereby indirectly imparted to the body of water.

5. The method of claim 1, wherein the water treatment substance is calcium hypochlorite.

* * * * *